F. KUHN, J. A. HAND AND J. G. SPIESS.
ELECTRICALLY HEATED INSTRUMENT.
APPLICATION FILED JAN. 25, 1919.
1,324,969.
Patented Dec. 16, 1919.
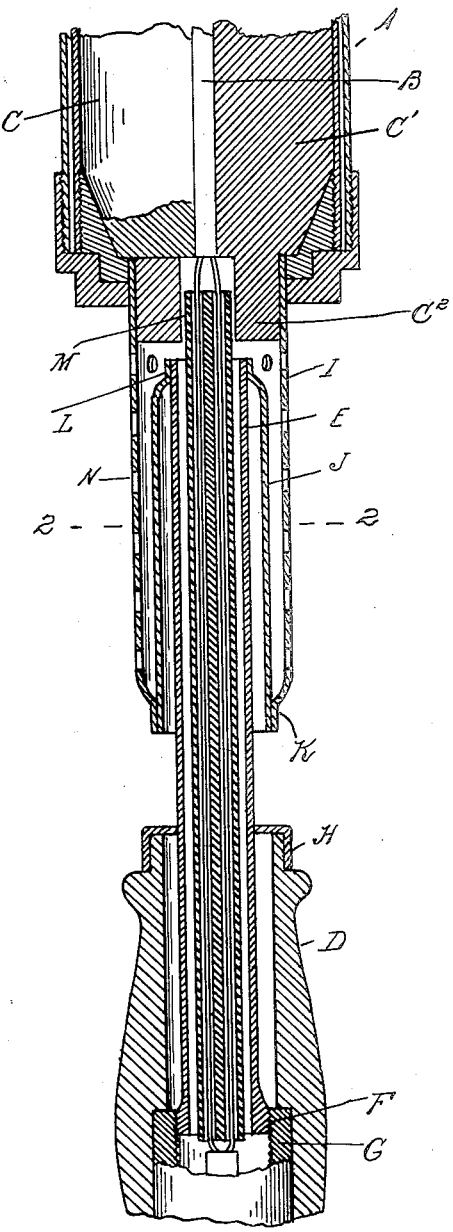
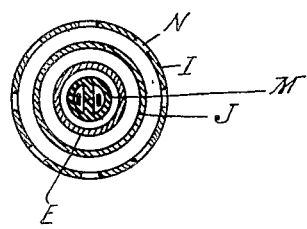
Inventors
Frank Kuhn
Jay A. Hand
Jules G. Spiess
By Whittemore Hulbert & Whittemore
Attorneys

UNITED STATES PATENT OFFICE.

FRANK KUHN, JAY A. HAND, AND JULES G. SPIESS, OF DETROIT, MICHIGAN, ASSIGNORS TO AMERICAN ELECTRICAL HEATER COMPANY, OF DETROIT, MICHIGAN, A CORPORATION OF MICHIGAN.

ELECTRICALLY-HEATED INSTRUMENT.

1,324,969.      Specification of Letters Patent.     Patented Dec. 16, 1919.

Application filed January 25, 1919. Serial No. 273,078.

*To all whom it may concern:*

Be it known that we, FRANK KUHN, JAY A. HAND, and JULES G. SPIESS, all citizens of the United States of America, residing at Detroit, in the county of Wayne and State of Michigan, have invented certain new and useful Improvements in Electrically-Heated Instruments, of which the following is a specification, reference being had therein to the accompanying drawings.

The invention relates to handled heated tools, such for instance as soldering irons, and has for its object the obtaining of a construction in which the conduction of heat to the handle is reduced. Where the heated portion of the tool is large and heavy it is necessary to provide a shank of sufficient strength for attachment of the handle, and the nearer the handle can be arranged to the tool the more easily can the latter be manipulated. On the other hand, with such a construction the metal of the shank will form a good conductor of heat so that the amount of heat transferred to the handle is objectionable. We have overcome this defect by a construction in which the length of path for heat conduction is greatly increased over the distance between the heated portion of the tool and the handle without diminishing the strength of the attachment.

The invention therefore consists in the construction as hereinafter more fully described.

In the drawings:

Figure 1 is a central longitudinal section through the heated tool and handle, showing the connection therebetween;

Fig. 2 is a cross-section through the shank on line 2—2 of Fig. 1.

A is a heated tool, such as a soldering iron, which, as shown, is electrically heated, being provided with the heating unit B and the heat-distributing bodies C C' on opposite sides thereof. The specific construction of the tool forms no part of the present invention and we will therefore omit further description of the same. D is a handle, preferably formed of wood and preferably hollow, for the passage of the electrical conductors and terminal connections therethrough. E is a tubular shank connected to the handle D, preferably by having a threaded portion F at its inner end which engages a nut member G in the hollow handle. H is a collar or ferrule secured to the shank E and surrounding the end of the handle D.

If the shank E were to pass directly to the tool A a very considerable amount of heat would be conducted therethrough to the injury of the handle as well as reducing the temperature of the tool. We therefore terminate the shank E a short distance from the tool and form a connection with the latter through the medium of connected sleeves, as follows: I is a sleeve member secured to a shank $C^2$ of one of the heat-distributing bodies C C'. This sleeve is of considerably larger diameter than the tubular shank E and extends rearward to a point a short distance from the inner end of the handle. Here the sleeve is connected with an inner sleeve J, spaced therefrom and also surrounding and spaced from the shank E. The connection may be effected by reducing the inner end of the sleeve I to fit the sleeve J, as indicated at K, and reducing the outer end of the sleeve J, as indicated at L, to fit the shank. The parts may then be brazed or otherwise secured to each other so as to form a strong connection. The terminal wires from the heating unit are preferably inclosed in a tube M of refractory insulating material which has a relatively low coefficient of thermal conductivity; this being also spaced from the shank $C^2$ of the heat-distributing body and the shank E of the handle.

When in use the heat from the tool can pass by conduction into the bodies C C' and from the shank $C^2$ into the sleeve I through which it may pass rearward. Inasmuch, however, as there is no direct connection between this sleeve I and the shank E, upon reaching the rear end of the former, the heat must pass outward again through the sleeve J before reaching the point of attachment to the shank E. This will increase the length for heat-conduction three times the length of the sleeve J, and as heat is being constantly lost by radiation during conduction, the temperature will be considerably lowered before finally reaching the handle. To increase the rate of heat dissipation, the outer sleeve I is preferably perforated, as indicated at N, so that a circulation of air may take place into and out from the space within the sleeve.

What we claim as our invention is:

1. The combination with a heated tool and a handle therefor, of a connection between said tool and handle, comprising an inner shank, a surrounding sleeve spaced therefrom, and a member extending in the space between said shank and sleeve connected to the free ends thereof.

2. The combination with a heated tool and a handle therefor, of a connection between said tool and handle, comprising a shank member attached to one, a sleeve member attached to the other and surrounding and spaced from said shank, and a second sleeve within the outer sleeve and surrounding said shank, having its opposite ends connected respectively to said shank and sleeve.

3. The combination with a heated tool and a handle therefor, of a shank connected to one and a sleeve connected to the other, spaced from and overlapping each other for the greater part of the distance between said tool and handle, and a second sleeve in the space between said first-mentioned sleeve and shank and having its opposite ends connected respectively thereto.

4. The combination with a heated tool and a handle, of a connection between said tool and handle, comprising a shank extending from the handle into proximity to the tool but spaced therefrom, a sleeve connected to the tool, surrounding and spaced from said shank and extending into proximity to the handle, and a second sleeve in the space between said shank and first-mentioned sleeve, having its outer end connected to the shank and its inner end connected to said first-mentioned sleeve.

5. The combination with an electrically heated tool and a handle therefor, of electrical connections passing from said tool through said handle, and a mechanical connection between said handle and tool, comprising a tubular shank surrounding said electrical connections and extending from said handle into proximity to said tool, a sleeve connected to said tool surrounding and spaced from said shank and extending into proximity to said handle, and an intermediate sleeve having its inner end connected to said first-mentioned sleeve and its outer end connected to said shank.

6. The combination with an electrically heated tool and a handle therefor, of electrical connections extending from said tool through said handle, an inclosing tube for said connections of low thermal conductivity, and a mechanical connection between said handle and tool, comprising a tubular shank connected to the handle and extending into proximity to the tool, said shank surrounding said tube, a sleeve connected to the tool and surrounding and spaced from said shank extending into proximity to said handle, and an intermediate sleeve having its inner end connected to said first-mentioned sleeve and its outer end connected to said shank.

In testimony whereof we affix our signatures.

FRANK KUHN.
JAY A. HAND.
JULES G. SPIESS.